March 5, 1946. C. S. McCHESNEY 2,396,186
TIRE PLY TURN DOWN MECHANISM
Original Filed Oct. 3, 1942 3 Sheets-Sheet 1
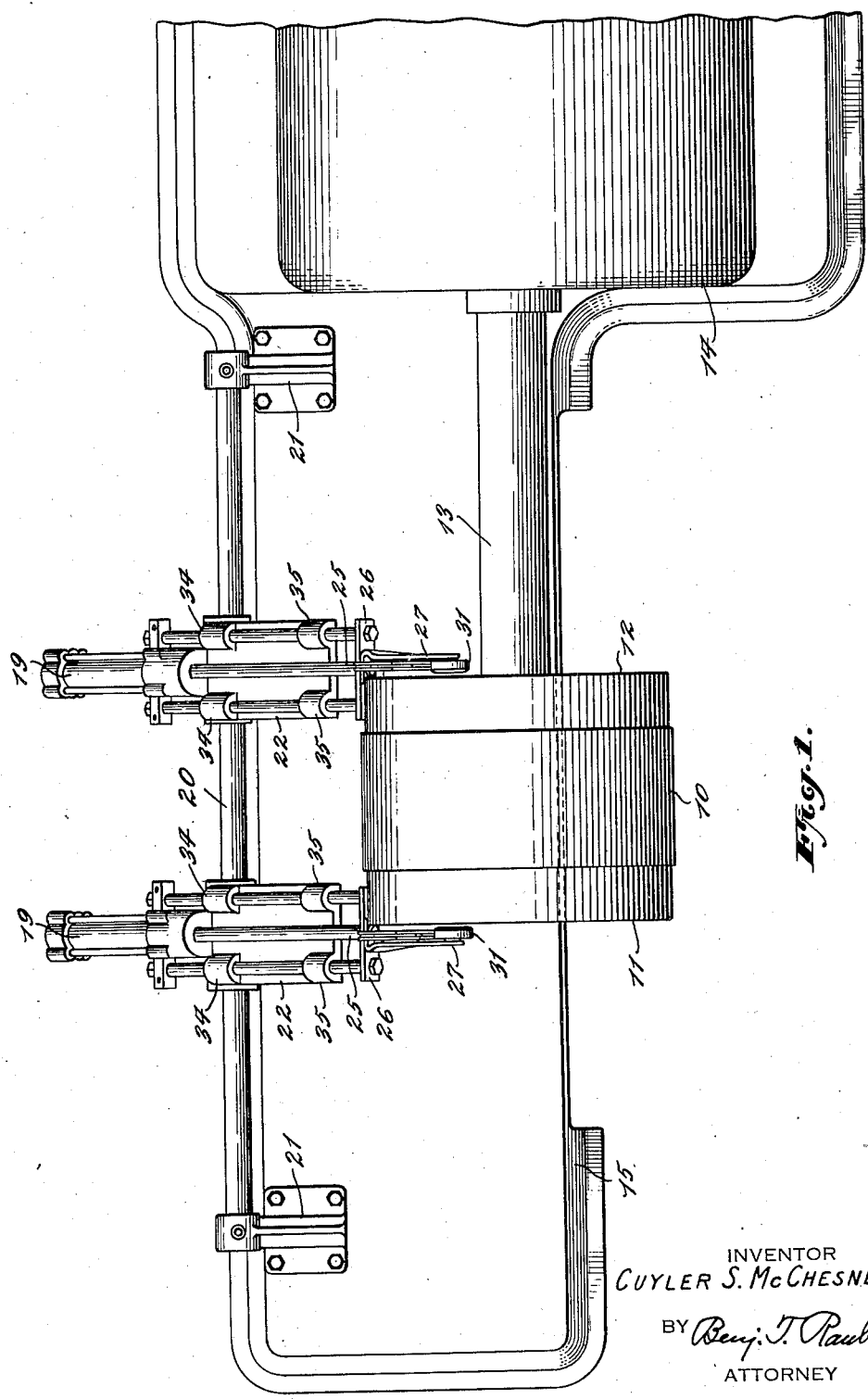
INVENTOR
CUYLER S. McCHESNEY
BY Benj. T. Rauber
ATTORNEY

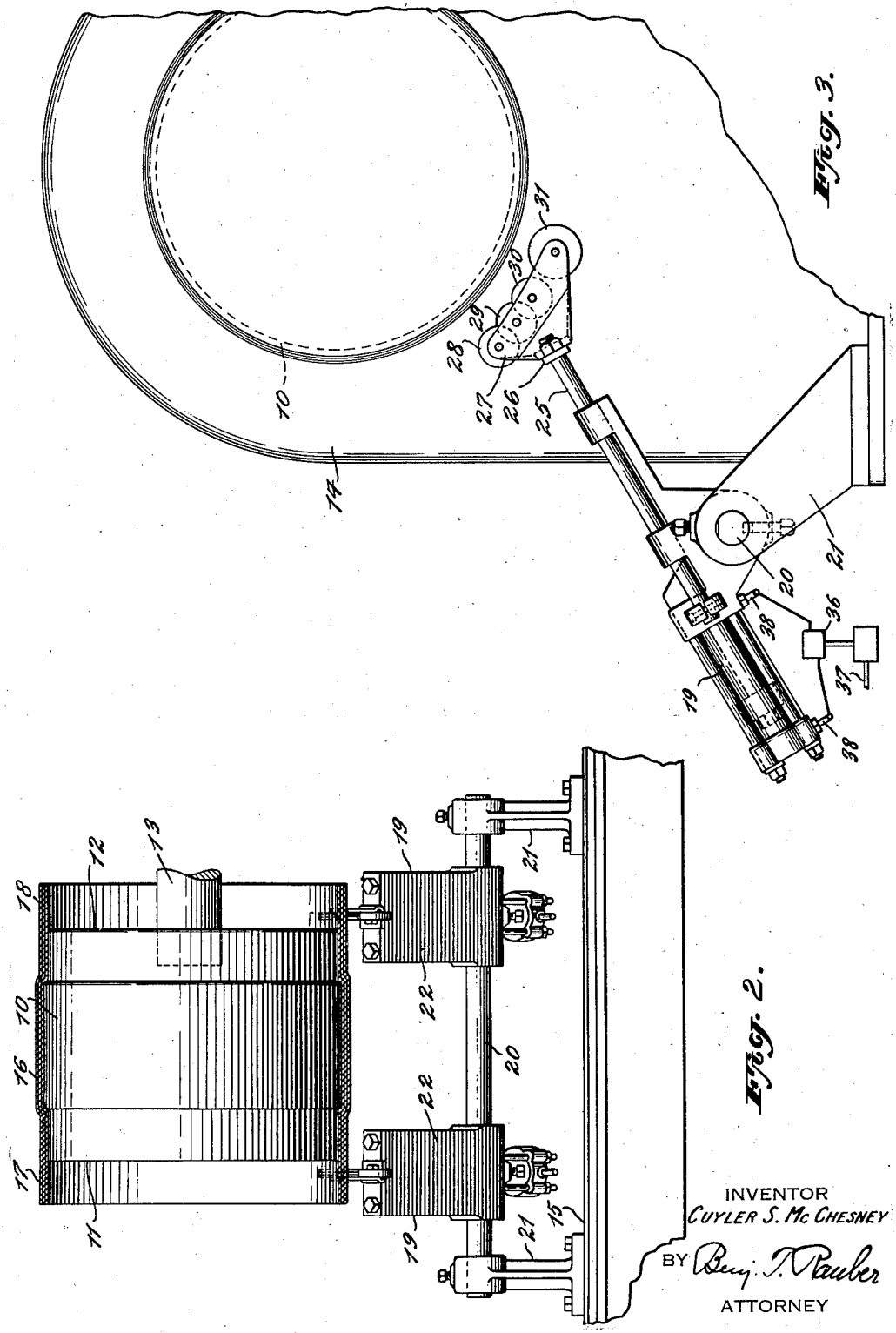

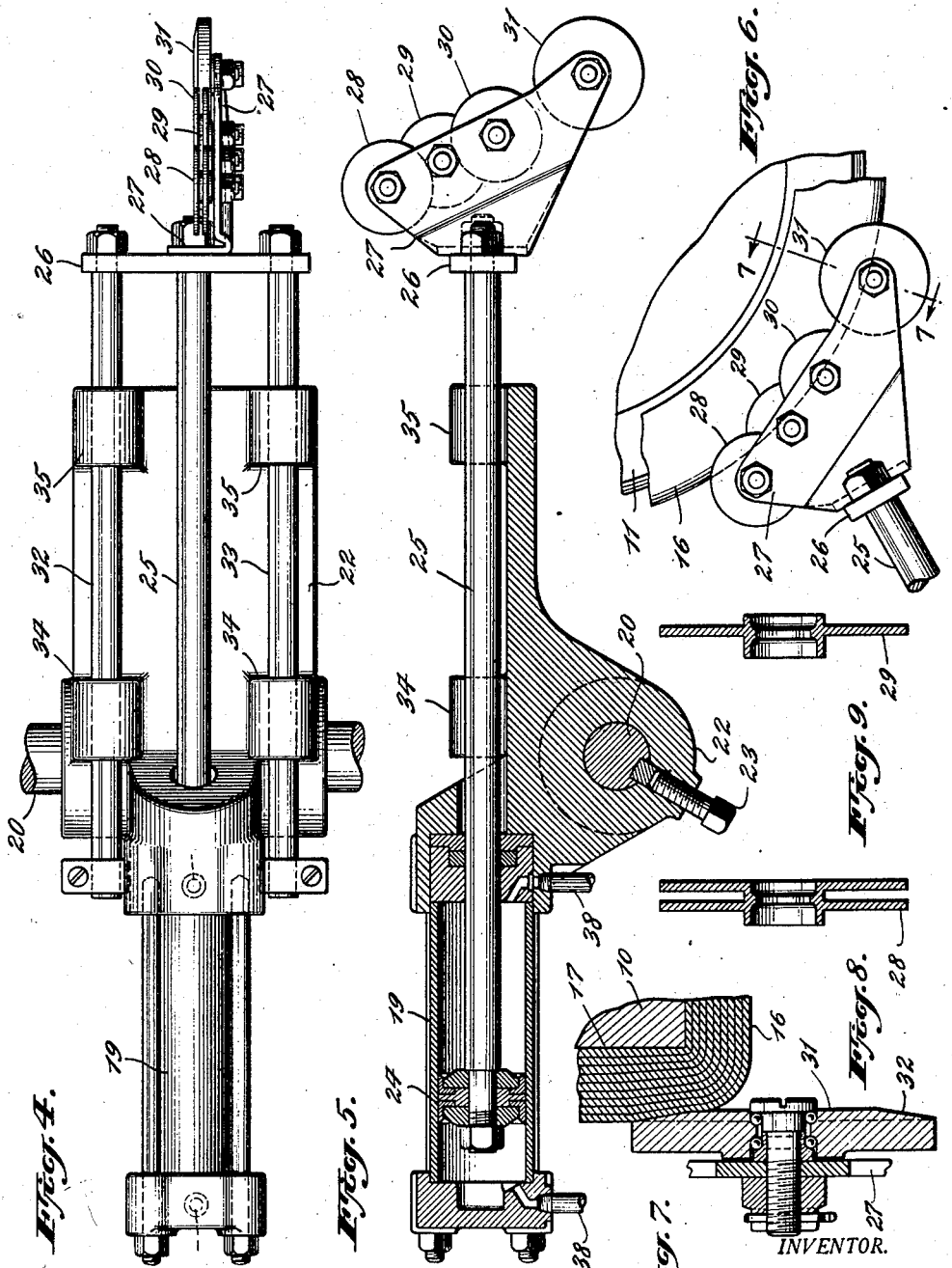

Patented Mar. 5, 1946

2,396,186

UNITED STATES PATENT OFFICE 2,396,186

TIRE PLY TURNDOWN MECHANISM

Cuyler S. McChesney, Kenmore, N. Y., assignor to Dunlop Tire and Rubber Corporation, Buffalo, N. Y., a corporation of New York Original application October 3, 1942, Serial No. 460,705. Divided and this application November 18, 1944, Serial No. 564,161

8 Claims. (Cl. 154—10)

My present application relates to an invention for turning the projecting parts of tire cord or fabric inwardly against the end surfaces of a forming drum.

The present application is a division of my co-pending application Serial No. 460,705, filed October 3, 1942 for "Tire building machine."

In forming a tire carcass on a rotating drum plies of bias cut cord or fabric are wrapped around the circumference of the drum, the width of the fabric being sufficient to overlap or overhang the ends of the drum. When a number of such plies, generally two or more, are thus applied to the drum the projecting ends of the plies are turned inwardly against the flat end surfaces of the drum preparatory to placing beads thereon.

In my present invention I provide a mechanism whereby the projecting ends of the plies are quickly and smoothly turned inwardly against the end surfaces of the drum to provide a smooth or flat uniform surface to which the beads may then be applied. The mechanism may be controlled manually to start the turning operation, but thereon proceeds to turn the projecting fabric and flatten it smoothly and tightly against the ends of the drum.

The various features of the invention are illustrated by way of example in the accompanying drawings in which Fig. 1 is a plan view of a tire building apparatus such as that shown in co-pending application Serial No. 460,705, and of a tire mechanism embodying my present invention applied thereto;

Fig. 2 is a front elevation showing a forming drum and, in section, the tire plies thereon prior to the turning down of the projecting ends thereof;

Fig. 3 is an end view of the mechanism of Figs. 1 and 2;

Fig. 4 is a plan view;

Fig. 5 is a vertical longitudinal section of the ply turndown mechanism;

Fig. 6 is a side view of a part of the ply turndown mechanism showing the position as it presses the ply against an end surface of the drum;

Fig. 7 is a section of a detail of the mechanism taken on line 7—7 of Fig. 6;

Figs. 8 and 9 are diametric sections of turndown disks forming a part of the mechanism of Figs. 4 and 5.

In the mechanism of my present invention the projecting ends of the ply are turned inwardly by a number of rotatable disks mounted on a bracket or carriage which carries these disks inwardly toward the center of the drum while the latter is rotating and spaced from the end surfaces of the drum a distance approximately equal to the total thickness of the plies. The plies are thus turned inwardly between the flat surfaces of the rotating disks and the end surfaces of the drum and as the disks move inwardly the fabric is pressed tightly against the drum.

The bracket carrying the disks is supported upon a slidable stem which is forced inwardly toward the center of the rotating drum and outwardly by a piston cylinder operated by pneumatic or other fluid pressure.

Referring more particularly to the accompanying drawings, the invention is illustrated as applied to a rotating drum 10 having substantially flat end surfaces 11 and 12 and carried on a rotating shaft 13 projecting from a housing 14 which carries bearings for supporting the shaft and a driving motor, not shown. The housing 14 is preferably mounted on a base 15 which projects beneath the drum 10 and shaft 13.

In building or forming a tire carcass plies of fabric 16 are wrapped on the circumference of the drum and are of sufficient width to project beyond the end surfaces of the drum as at 17 and 18, Fig. 2. After the plies have thus been wrapped on the drum the projecting parts 17 and 18 are turned inwardly against the end surfaces 11 and 12 as indicated in Fig. 7.

Each of these mechanisms comprises a pneumatic cylinder 19, Figs. 1 to 5, mounted on a common shaft 20 which is in turn supported by brackets 21 extending upwardly from the base 15. Each of the cylinders 19 has an extension 22 through which the shaft 20 passes and which is secured to the shaft by means of a set screw 23.

Within the cylinder 19 is a piston 24 having a stem 25 extending over the extension 22 and carrying at its projecting end a cross-plate 26 on which is mounted a bracket 27 carrying an assembly of turnover disks 28, 29, 30, 31. The crossplate 26 is guided in movements of reciprocation by a pair of guide rods 32 and 33 that extend through spaced guides 34 and 35 respectively.

When the projecting edges of the plies are to be turned down against the face of the drum, air under pressure is admitted through an electromagnetic valve 36 and a supply pipe 37, Fig. 3, to the lower end of the cylinder 19 and exhausted from the upper end of the cylinder through a pipe 38 and the valve 36 forcing the stem 25 outwardly and thus forcing the disk-carrying heads 27 and disks 28, 31 outwardly against the side surfaces 11 and 12 of the drum. When the turnover disks are to be withdrawn, pressure fluid is admitted to the opposite end of the cylinder through valve 36 and pipes 37 and 38.

The disks 28 and 30 consist of double disks or a pair of spaced disks as shown particularly in Fig. 8, and the disk 29 is a single disk fitting in the spaces or grooves of the disks 28 and 30 so as to form a substantially continuous face to press the plies progressively inwardly toward the flat end faces 11 and 12 of the drum, and finally the disk 31 presses the plies tightly against the end faces of the drum as shown more particularly in Fig. 7.

When the plies have been pressed against the ends of the drum 10 the head 27 and disks 28, 29, 30, 31 are withdrawn leaving the surface of the plies free to receive the beads.

The mechanism is actuated while the tire forming drum is rotating and the speed of movement of the head 27 relative to the speed of rotation of the drum is such that the disks 28—31 will advance in a gradual spiral path relative to the end face of the drum.

The disks 28, 29, 30 are spaced from the end face of the drum sufficiently to turn the plies 17 lightly against the end face of the drum without wrinkling the smoothly turned plies and the end disk 31 is then brought into contact. This disk has an end surface that is slightly beveled as at 32, Fig. 7, to press the turned over plies progressively closer or tighter to the end face of the drum.

The plies are of cords or fabric embedded in unvulcanized rubber which has a tacky surface so that the plies adhere to each other and also to the end face of the drum.

While the drum is rotating and by its rotation rotates the disks 28—31 the disks may be withdrawn without disturbing the turned over plies, leaving the plies in condition to receive a bead ring in the next step of manufacture of the tire carcass.

It will be noted that the stem 25 projects in a line crossing the end face of the drum between its center or axis and its peripheral edge. This is the preferred position of the stem for effectively and smoothly turning down the plies.

What I claim is:

1. Apparatus for turning down the projecting ends of ply fabrics against the end surface of a forming drum which comprises a stem projecting in a line crossing the face of the drum, a head mounted on said stem and a series of disks rotatably mounted on said head with faces in parallel planes slightly spaced from the end face of said drum and substantially parallel to said end face and means to move said stem and head in a direction transverse to the periphery of said drum.

2. Apparatus for turning down the projecting edges of tire fabrics against the end face of a rotating forming drum which comprises a stem projecting on a line overlapping the end face of said drum, a head mounted on said stem and a series of disks rotatably mounted on said head with faces in parallel planes slightly spaced from and substantially parallel to the end face of said drum and positioned on said head progressively closer to the axis of rotation of said drum and means to move said stem in a direction transverse to the periphery of said drum.

3. Apparatus for turning the projecting ends of tire fabric onto the end face of a rotating forming drum which comprises a stem projecting toward said drum, a head mounted on said stem, a series of disks rotatably mounted on said head with faces in parallel planes slightly spaced from and substantially parallel to the end face of said drum, said disks comprising a single disk and a pair of double disks having spaces to receive said single disk.

4. Apparatus for turning the projecting ends of tire fabric onto the end face of a rotating forming drum which comprises a stem projecting toward said drum, a head mounted on said stem, a series of disks rotatably mounted on said head in position to overlap and be slightly spaced from the end face of said drum as said stem is moved toward said drum, said disks comprising a single disk and a pair of double disks having spaces to receive said single disk and a finishing disk having a peripherally beveled face lying closer to the end face of said drum.

5. Apparatus for turning the projecting ends of tire fabric inwardly toward the end face of a forming drum which comprises a stem projecting toward said drum, fluid operated means for moving said stem toward and from said drum, a head mounted on said stem and a series of disks rotatably mounted on said head with faces in parallel planes to overlap and be slightly spaced from the end face of said drum.

6. Apparatus for turning the projecting ends of tire fabric inwardly against the end face of a rotating forming drum which comprises a series of rotatable disks having their side faces in substantially parallel planes slightly spaced from the end face of said drum and means to move said disks as a unit in their respective planes toward the axis of said drum to overlap the end faces of said drum.

7. Apparatus for turning the projecting ends of tire fabric inwardly against the end face of a drum which comprises a series of disks having substantially flat surfaces slightly spaced from the end face of said drum and a disk having a peripherally beveled side face extending closer to the end face of said drum and means for moving said disks progressively over the peripheral part of the end face of said drum.

8. Means for turning the projecting ends of tire fabric inwardly against the end face of a rotating forming drum which comprises a series of flat disks, certain of said disks having a peripheral groove to receive an intermediate disk and to form a substantially flat surface and means to move said disks over the peripheral part of the end face of said drum and slightly spaced therefrom.

CUYLER S. McCHESNEY.